(12) United States Patent
Latulippe

(10) Patent No.: US 11,499,572 B2
(45) Date of Patent: Nov. 15, 2022

(54) CARTRIDGE-BASED FAN APPARATUS

(71) Applicant: Justin Latulippe, Kalamazoo, MI (US)

(72) Inventor: Justin Latulippe, Kalamazoo, MI (US)

(73) Assignee: Justin Latulippe, Kalamazoo, MI (US)

( * ) Notice: Subject to any disclaimer, the term of this patent is extended or adjusted under 35 U.S.C. 154(b) by 124 days.

(21) Appl. No.: 17/091,000

(22) Filed: Nov. 6, 2020

(65) Prior Publication Data

US 2021/0140447 A1 May 13, 2021

Related U.S. Application Data

(60) Provisional application No. 62/931,846, filed on Nov. 7, 2019.

(51) Int. Cl.

| F04D 29/70 | (2006.01) |
|---|---|
| F04D 29/52 | (2006.01) |
| F04D 13/06 | (2006.01) |
| F04D 29/64 | (2006.01) |
| F04D 19/00 | (2006.01) |
| F04D 25/06 | (2006.01) |
| F04D 27/00 | (2006.01) |
| F04D 29/42 | (2006.01) |
| F04D 29/62 | (2006.01) |
| F04D 25/08 | (2006.01) |
| H02K 7/14 | (2006.01) |

(Continued)

(52) U.S. Cl.
CPC ........... *F04D 29/703* (2013.01); *F04D 13/06* (2013.01); *F04D 19/002* (2013.01); *F04D 25/0606* (2013.01); *F04D 25/0613* (2013.01); *F04D 25/0646* (2013.01); *F04D 25/0653* (2013.01); *F04D 25/08* (2013.01); *F04D 27/004* (2013.01); *F04D 29/4226* (2013.01); *F04D 29/522* (2013.01); *F04D 29/626* (2013.01); *F04D 29/646* (2013.01); *H02K 7/14* (2013.01); *H02K 11/33* (2016.01); *H02K 29/08* (2013.01)

(58) Field of Classification Search
CPC .... F04D 29/646; F04D 29/626; F04D 29/703; F04D 27/004; F04D 29/4226; F04D 25/08; F04D 19/002; F04D 25/0653; F04D 25/0606; F04D 25/0613; F04D 25/0646; F04D 29/522; F04D 13/06; H02K 7/14; H02K 11/33; H02K 29/08
See application file for complete search history.

(56) References Cited

U.S. PATENT DOCUMENTS

| 2,619,021 | A | * | 11/1952 | Pfautsch | ............... | F04D 29/646 |
| | | | | | | 439/372 |
| 2,900,892 | A | * | 8/1959 | Shepherd | ............. | F04D 29/646 |
| | | | | | | 454/355 |

(Continued)

*Primary Examiner* — Peter J Bertheaud
(74) *Attorney, Agent, or Firm* — Caldwell Intellectual Property Law

(57) ABSTRACT

A cartridge-based fan apparatus includes a cartridge component, wherein the cartridge component includes at least an airflow driver and at least a first spindle secured to a rotary device, a cartridge housing unit, wherein the cartridge housing unit includes a cartridge insertion chamber, a motor, and a drive element that mechanically couples the motor to the spindle when the cartridge is inserted in the cartridge insertion chamber, and a securing mechanism that secures the cartridge component in the cartridge insertion chamber.

19 Claims, 9 Drawing Sheets

(51) Int. Cl.
*H02K 29/08* (2006.01)
*H02K 11/33* (2016.01)

(56) References Cited

U.S. PATENT DOCUMENTS

| | | | | | |
|---|---|---|---|---|---|
| 2,931,562 | A | * | 4/1960 | Wistrand | F04D 29/4226 |
| | | | | | 392/379 |
| 3,305,163 | A | * | 2/1967 | Sheppard | F24F 7/06 |
| | | | | | 415/223 |
| 3,871,795 | A | * | 3/1975 | Habdo | F04D 29/626 |
| | | | | | 417/361 |
| 5,185,941 | A | * | 2/1993 | Dongelmans | F04D 29/703 |
| | | | | | 454/355 |
| 6,525,938 | B1 | * | 2/2003 | Chen | F04D 25/066 |
| | | | | | 310/91 |
| 7,044,721 | B2 | * | 5/2006 | Horng | H02K 1/187 |
| | | | | | 417/423.7 |
| 7,455,500 | B2 | * | 11/2008 | Penlesky | F04D 29/626 |
| | | | | | 415/206 |

* cited by examiner

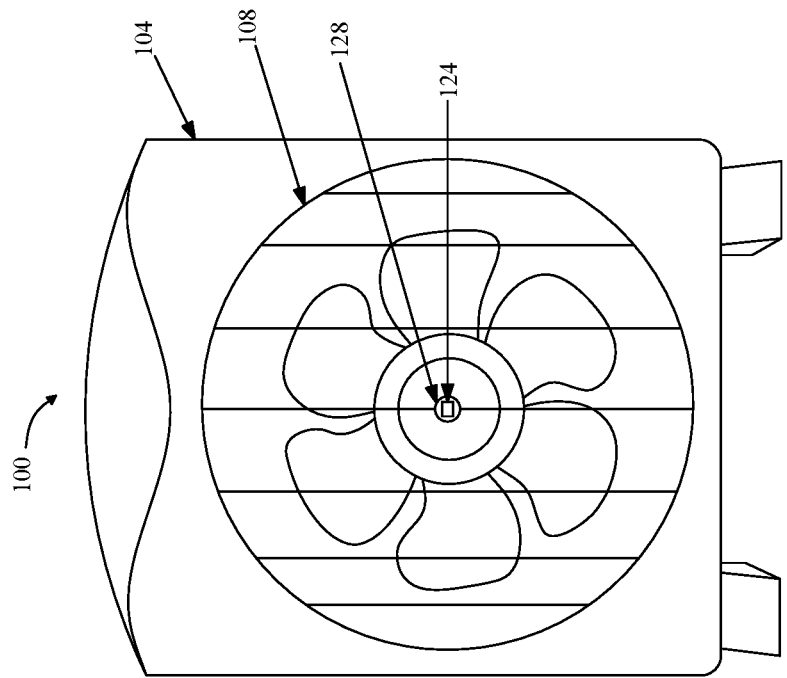
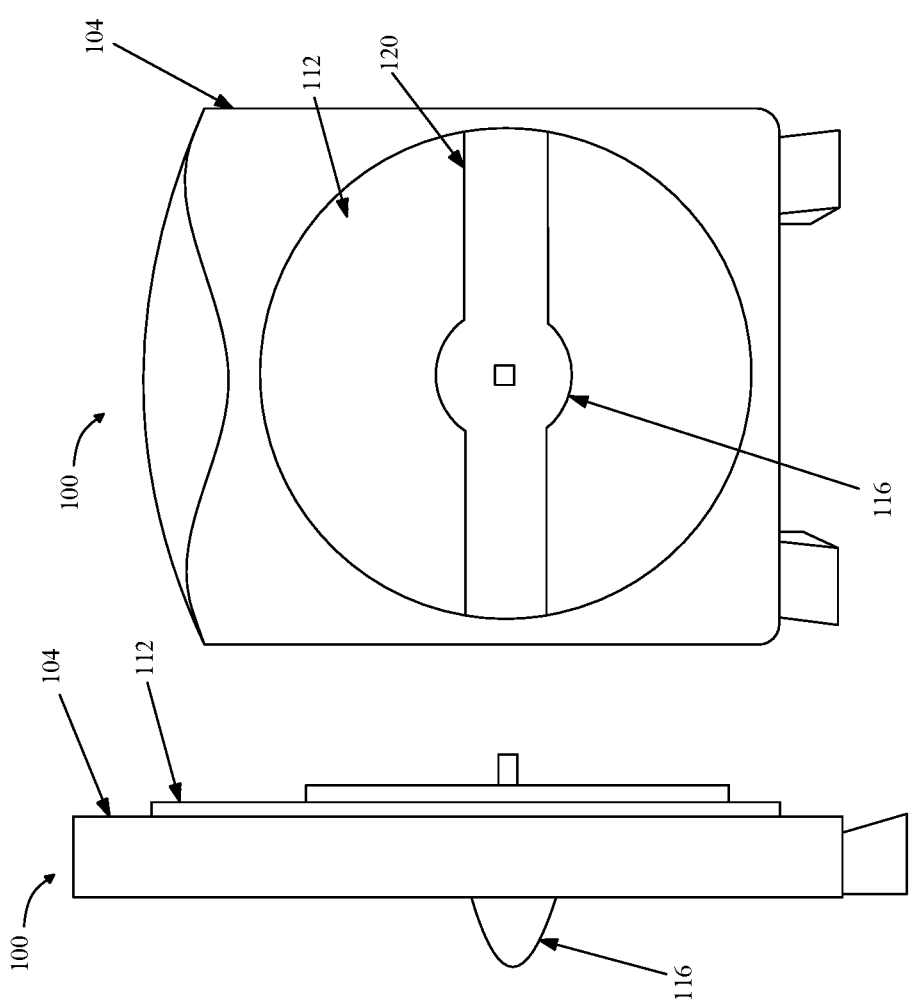

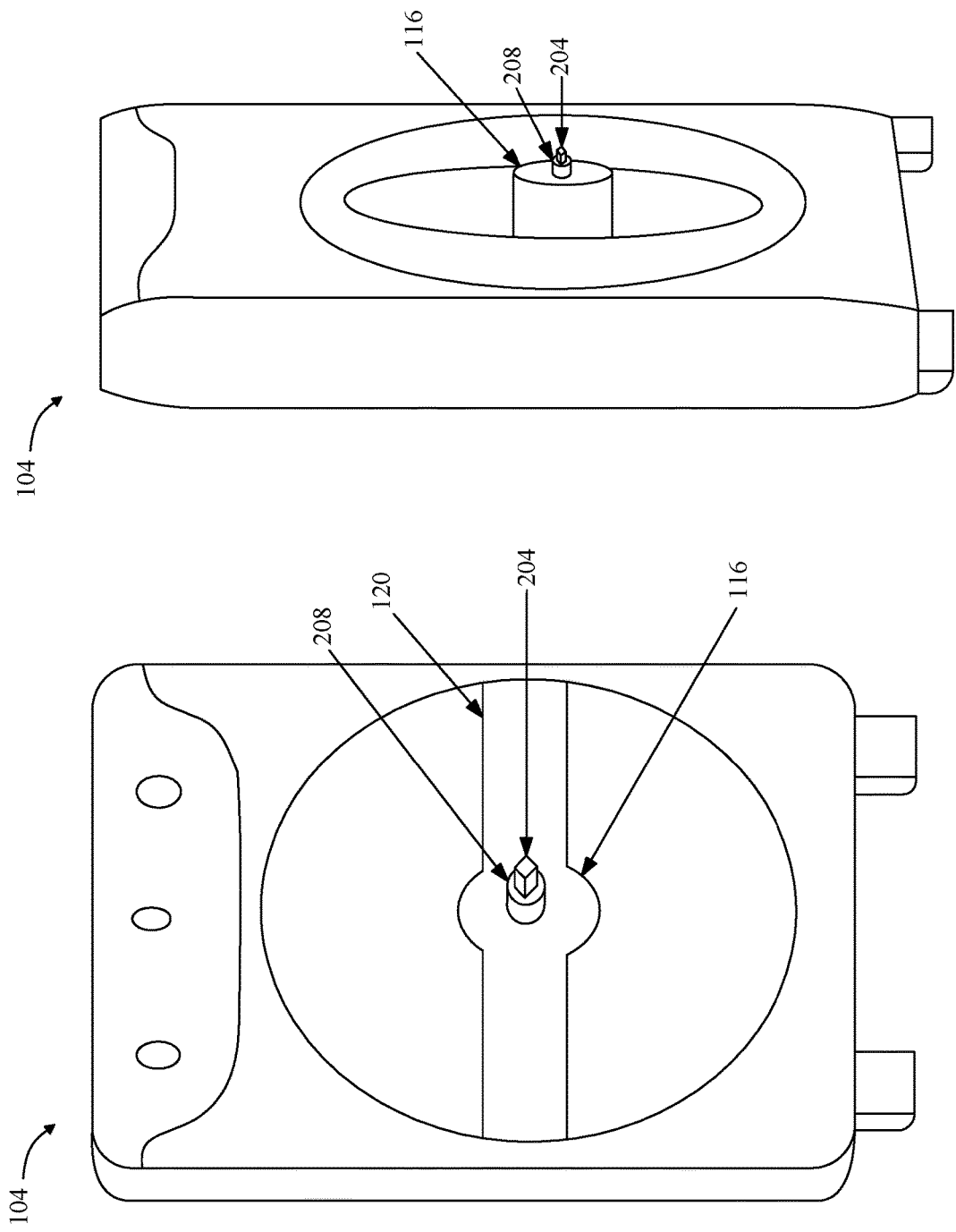

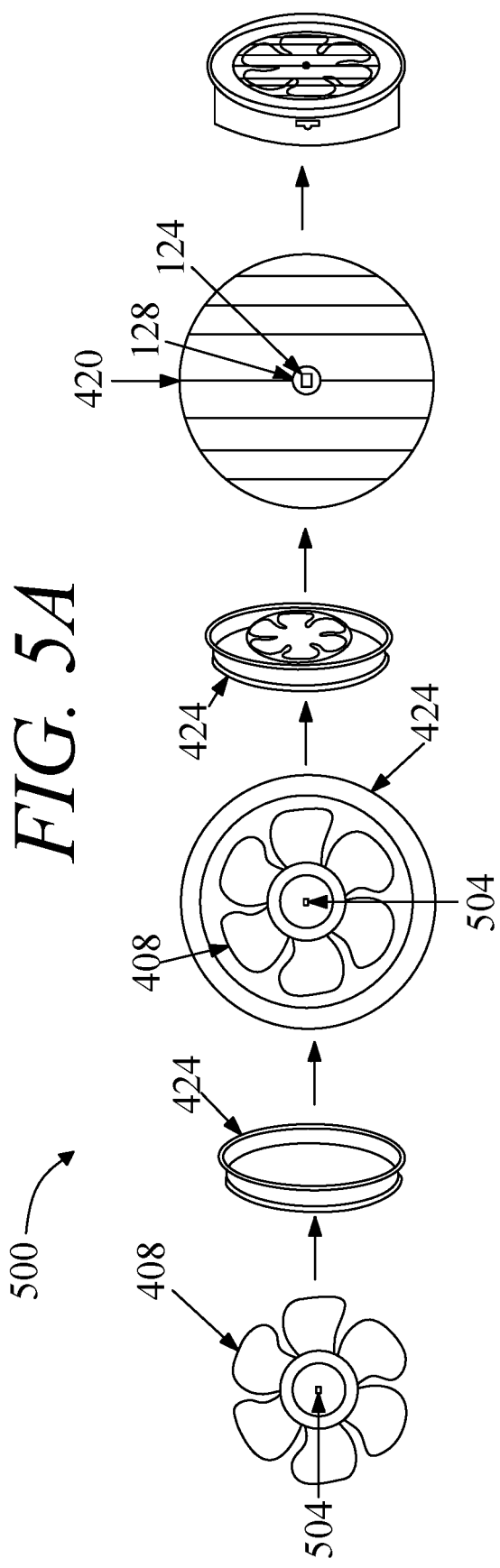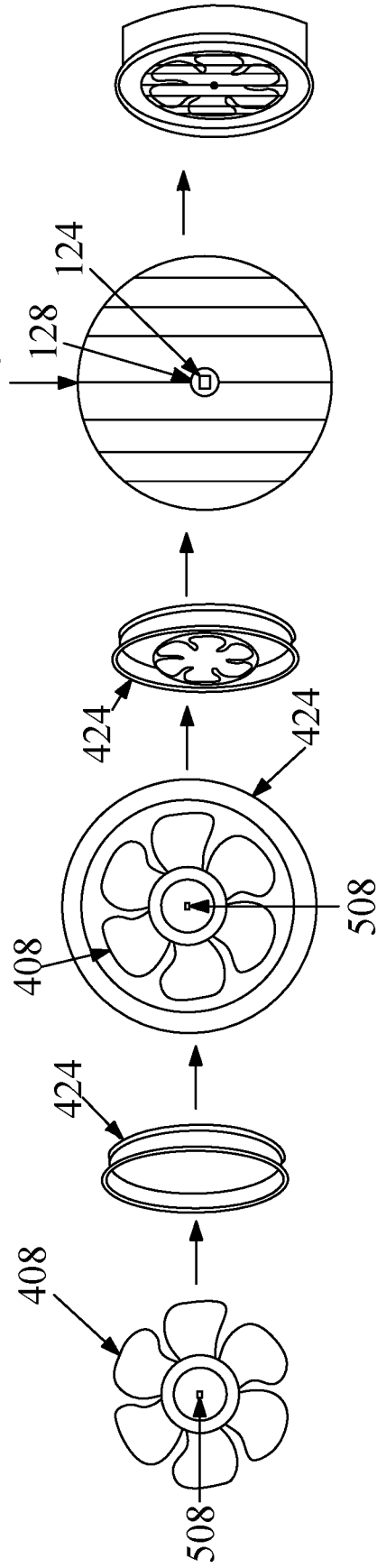

CARTRIDGE-BASED FAN APPARATUS

CROSS-REFERENCE TO RELATED APPLICATIONS

This application claims the benefit of priority of U.S. Provisional Patent Application Ser. No. 62/931,846, filed on Nov. 7, 2019, and titled "Single-Use Personal Fan Assembly," which is incorporated by reference herein in its entirety.

FIELD OF THE INVENTION

The present invention generally relates to the field of personal fan apparatuses. In particular, the present invention is directed to a cartridge-based fan apparatus.

BACKGROUND

Personal fans are susceptible to a buildup of dust and other debris found in the air, such as bacteria, lint, dander, allergens, and the like. The inability to clean the blades of personal fans creates a health risk for those in the near vicinity. Specifically in a hospital, a personal fan poses a risk of infection for the patient and/or hospital staff due to the lack of proper cleaning capabilities required between each use, wherein each use includes a different end user.

SUMMARY OF THE DISCLOSURE

In an aspect a cartridge-based fan apparatus includes a cartridge component, wherein the cartridge component includes at least an airflow driver, and at least a first spindle secured to a rotary device, a cartridge housing unit, wherein the cartridge housing unit includes a cartridge insertion chamber, a motor, and a drive element that mechanically couples the motor to the spindle when the cartridge is inserted in the cartridge insertion chamber, and a securing mechanism that secures the cartridge component in the cartridge insertion chamber.

In another aspect a method of a cartridge-based fan apparatus includes receiving, by a processor, contamination input from at least a contamination sensor, determining, by the processor, at least a contamination enumeration, wherein the contamination enumeration is determined as a function of an at least contamination machine-learning model, generating by the processor, a temporal limit as a function of the at least a contamination enumeration; and presenting, by the processor the temporal limit.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1A-C is a schematic diagram of an exemplary embodiment of a cartridge-based fan apparatus;

FIG. 2A-B is a schematic diagram of an exemplary embodiment of a cartridge housing unit;

FIG. 5A-B is a schematic diagram of an exemplary embodiment of the assembly of the cartridge;

Figure 3:
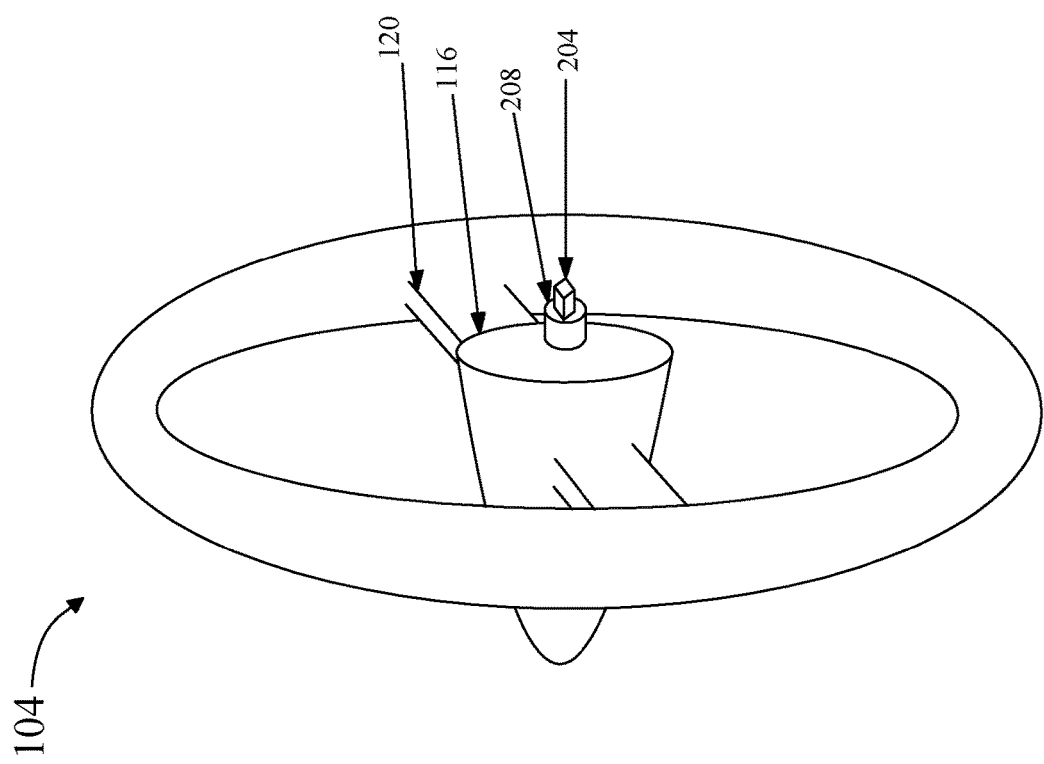
FIG. 3 is a schematic diagram of an exemplary embodiment of the motor of the cartridge housing unit.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a cartridge-based fan apparatus. In an embodiment, a cartridge-based fan apparatus utilizes at least a cartridge containing an airflow driver. Aspects of the present disclosure allow for the cartridge component to be inserted to a cartridge housing unit. This is so, at least in part, because the cartridge housing unit has a combination fitting that at least secures the cartridge to the cartridge housing. Embodiments of the assembly herein describe a means for a cartridge component associated with elements of a personal fan to be replaced in a cartridge housing unit for each user.

Referring now to FIGS. 1A-C, a schematic of apparatus 100 of a cartridge-based personal fan apparatus is presented. Apparatus 100 includes a cartridge housing unit 104. As used in this disclosure "cartridge housing unit" is a structure and/or combination of structures configured to couple to a cartridge component, wherein the cartridge component is the replaceable element comprising the fan and/or additional sensors, discussed in detail below. Cartridge housing unit 104 provides a source of power to cartridge 108 using one or more sources of power, wherein a source of power may include a battery. The battery may comprise one or more battery elements/batteries that at least provides a source of power to cartridge 108. The battery may include one or more battery elements in parallel and/or series configured to provide power to at least cartridge 108. For example, the battery may comprise one or more lithium-ion batteries, alkaline batteries, lead-acid batteries, aluminum-ion batteries, flow batteries, magnesium-ion batteries, metal-air electrochemical cells, nickel-ion batteries, zinc-ion batteries, or any combination thereof, to name a few. According to embodiments, the power source may comprise an alternative power source such as an alternating current ("AC") power source, direct current ("DC") power source, power over ethernet (PoE), a solar photovoltaic cell, wireless power transfer, a wind turbine, or any combination thereof, and/or power electronics such as a half-bridge rectifier, full-bridge rectifier, inverter, maximum-point power tracker, power converter (such as a buck converter, boost converter, buck-boost converter, flyback converter, transformer, etc.), hydraulic motor, hand crank, internal combustion engine, or any combination thereof, to name a few. In embodiments, if the battery includes PoE, a DC power source, and/or an AC wall outlet power, operation of cartridge 108 may maintain power at all times. The battery and/or energy storage device may alternatively or additionally include a kinetic, capacitive, inductive, fuel-based (e.g. a fuel cell) and/or any other device or component for storage of electrical energy and/or chemical or other energy for conversion to electronic energy. The battery may include one or more rechargeable batteries that at least can be charged, discharged into a load, and recharged many times, as opposed to a disposable battery. The rechargeable battery may be comprised of one or more electrochemical cells, that at least maintain a reversible electrochemical reaction. Electrochemical cells may include, without limitation, lead-acid, zinc-air, nickel cadmium, nickel-metal hydride, lithium-ion, lithium iron phosphate, lithium-ion polymer, and the like thereof.

Still referring to FIGS. 1A-C, cartridge housing unit 104 includes a cartridge insertion chamber 112. As used in this disclosure the "cartridge insertion chamber" is a hollow central location on cartridge housing unit 104 where cartridge 108 is to be placed. Cartridge insertion chamber 112 includes at least a motor 116 concentric to a support bracket 120 on cartridge housing unit 104. As used in this disclosure "motor" is a system that converts electrical, chemical, nuclear, radiant, and/or thermal power sources to mechanical energy. As used in this disclosure "support bracket" is a structure that at least secures cartridge 108 in cartridge insertion chamber 112. Motor 116 is configured to include any motor that converts at least a type of energy into mechanical energy. As a non-limiting example, a motor may include, without limitation an electric drive motor. An electric drive motor may include, without limitation, a/an DC motor, DC shunt motor, separately excited motor, dc series motor, PMDC motor, DC compound motor, AC motor, synchronous motor, induction motor, stepper motor, brushless DC motor, hysteresis motor, reluctance motor, universal motor, and the like thereof. Energy may include any source of power as described above, such as electrical, nuclear, thermal, chemical, and the like thereof. Persons skilled in the art, upon reviewing the entirety of this disclosure, will be aware of various motors which may be suitable for use as motor 116 consistently with this disclosure. Motor 116 may be concentric to support bracket 120 on cartridge housing unit 104, wherein support bracket 120 may connect to cartridge housing unit 104 on either end of a diameter of cartridge insertion chamber 112. Support bracket 120 may include any material used to create a cartridge housing unit 104. For instance and without limitation, support bracket 120 may be created utilizing plastics, such as thermosets, thermoplastics, Polyethylene terephthalate (PET or PETE), Polyvinyl Chloride (PVC), Polytetrafluoroethylene (Teflon), Polyvinylidine Chloride (Saran), Polyethylene, LDPE and HDPE, or Polypropylene (PP), metals, carbon fibers, polycarbonate, ceramics, wood, and the like. Plastics may include recyclable plastic that may be used one or more times to produce cartridge housing unit 104, cartridge component 108 and/or any of the components associated in the invention. As a non-limiting example, support bracket 120 may include one or more motors as a function of the torque requirements.

With continued reference to FIGS. 1A-C, apparatus 100 includes a cartridge component 108. Cartridge component 108, as described herein, is the replaceable element comprising the airflow driver, wherein the airflow driver includes a mechanism that at least displaces air volume using either laminar and/or turbulent flow patterns. An airflow driver may include one or more basic groups of airflow including, but not limited to propeller groups, axial groups, centrifugal groups, barrel groups, cylindrical groups, and the like thereof. Propeller groups may include, without limitation, a plurality of propeller blades, discussed in detail below. Axial groups may include, without limitation blades that at least extract air and force the air to move parallel to a main shaft about which the blades rotate. Axial groups may be utilized for one or more purposes to move air from a first location to a second location, such as in the extraction of air in vehicles, kitchens, painting booths, furnaces, foundries, and the like thereof. Centrifugal groups may include, without limitation, impeller blades that rotate about a central shaft causing air to enter the and move outwards to the outlet by deflection and/or centrifugal force. The airflow driver may include at least a parameter of capacity, pressure, efficiency, and or speed of rotation to determine the magnitude of airflow. Blades may be interchangeable according to one or more comfort levels. As used in this disclosure "comfort levels" are magnitudes of background and/or white noise that are at least generated as a function of the pitch angle and/or shape of the propeller edge, wherein a pitch angle is the degree of angle that is set in relation to the plane of rotation and the propeller edge is the shape of the leading and/or trailing edge of the blade that at least interacts with the stagnant air. As a non-limiting example a comfort level of 3 may be identified for a pitch angle of 17 degrees and a rounded blade edge, wherein a comfort level of 7 may be identified for a pitch angle of 19 degrees and a tapered blade edge. Blades may be designed such that each comfort level is unique to each user. As a non-limiting example an airflow driver may include 3 blades, wherein first blade has a comfort level of 7, the second blade has a comfort level of 2 and the third blade has a comfort level of 5, wherein the varying comfort levels generate a unique background and/or white noise frequency for each user.

Still referring to FIGS. 1A-C, cartridge component 108 may include at least a first spindle 124. At least a first spindle 124 may be secured to a rotary device 128 by a combination fitting, wherein rotary device 128 may be concentric to an external shield, wherein an external shield is described in detail below. As used in this disclosure "first spindle" is a rod, pin, and or spike that at least intersects the airflow driver and the rotary device. As used in this disclosure "rotary device" is a bearing that carries a load by placing rolling elements between two bearing races that at least allow the races to rotate with very little friction and/or resistance. Rotary device 128 may be a ball bearing, cylindrical roller, spherical roller, gear bearing, tapered roller, needle roller, CARB toroidal roller bearing, and the like thereof that at least maintains separation between two bearing races. As used in this disclosure a "combination fitting" is a union and/or link that unites at least a first mechanical component to at least a second mechanical component, wherein the first mechanical component may include at least first spindle 124 and the second mechanical component may include rotary device 128. The combination fitting may include, for example and without limitation, a means and/or combination of means of coupling first spindle 124 to rotary device 128, such as a male coupler, female coupler, magnetic coupling, gear tooth coupling, and the like thereof. As a further non-limiting example, the combination fitting may include a non-manipulative fitting, such as a compression fitting. As used in this disclosure "non-manipulative fitting" is a standard fitting that requires no modifications when coupling the at least first mechanical component to the at least second mechanical component. As a further non-limiting example, the combination fitting may include a manipulative fitting. As used in this disclosure "manipulative fitting" is a standard fitting that requires modification of the at least first mechanical component and/or the at least second mechanical component when coupling the at least first mechanical component to the at least second mechanical component. As a non-limiting example, a first spindle of a square dowel that at least intersects with the airflow driver, wherein the airflow driver may include 5 propeller blades, which may be secured via a compression fitting to a ball-bearing rotary device such that the first spindle and airflow driver may rotate with little to no friction whilst being secured to an external shield of a metal wire frame.

Still referring to FIGS. 1A-C, cartridge component 108 may include at least a filter. As used in this disclosure "filter" is a pollution control technique using one or more fibrous and/or porous materials that remote solid particles, such as dust, pollen, mold, bacteria, and the like thereof from the air. The filter may contain one or more adsorbents and/or catalysts that at least remove odors and/or gaseous pollutants, wherein a gaseous pollutant may include, without limitation, volatile organic compounds and/or ozone. As a non-limiting example, filters may consist of one or more course filters, fine filters, semi-High-efficiency particulate air (HEPA) filters, HEPA filters, Ultra-low particulate air (ULPA) filters, and the like thereof. Cartridge component 108 may include one or more disinfecting elements. As used in this disclosure "disinfecting elements" are components that at least reduce the contamination of cartridge component 108. As a non-limiting example, disinfecting elements may include ultraviolet radiation, ultraviolet-c radiation, heat treatment, and or oligodynamic treatment, wherein an oligodynamic treatment is a biocidal effect of metals. Additionally or alternatively, cartridge housing unit 104 and/or cartridge component 108 may be comprised of one or more anti-microbial polymers, wherein anti-microbial polymers include one or more polymers that contain embedded chemicals and/or metals that at least provide decontamination effects. As a non-limiting example an anti-microbial polymer may include a polymeric biocide, such as a polyamide, polyester, polyurethane, and the like thereof.

Referring now to FIGS. 2A-B, an embodiment of cartridge housing unit 104 is illustrated. Cartridge housing unit 104 includes motor 116, wherein motor 116 is concentric to support bracket 120, as described above in reference to FIGS. 1A-C. Motor 116 may include at least a second spindle 204. As used in this disclosure "second spindle" is a rod, pin, and or spike that at least extrudes from motor 116. Second spindle 204 may couple motor 116 to the airflow driver located in cartridge component 108. Second spindle 204, when coupled to the airflow driver, may allow motor 108 to rotate the airflow driver of cartridge component 108 when motor 116 receives at least a source of power. As a non-limiting example, second spindle 204 may couple to cartridge component 108 using at least a male coupler, female coupler, compression fit, magnetic coupling, gear tooth coupling, and the like thereof. Persons skilled in the art, upon reviewing the entirety of this disclosure, will be aware of various means of coupling which may be suitable for use as a secondary spindle 204 consistently with this disclosure. Second spindle 204 may be comprised of at least a wood, plastic, thermoplastic, polymer, copolymer, metal, ceramic, glass, and/or carbon fiber material. Second spindle 204 may include recyclable plastic that may be used one or more times to produce additional spindles. Cartridge housing unit 104 may include at least a drive element 208 that mechanically couples motor 112 to second spindle 204. As used in this disclosure "drive element" is a structure that at least couples the motor shaft to second spindle 204. As a non-limiting example, a drive element may incorporate a square driveshaft receiver for a motor shaft on one end, whilst a second end may include an axle hex Allen receiver. The drive element may be maneuvered by at least an electric motor, wherein an electric drive motor is described in detail above, in reference to FIG. 1. Additionally or alternatively, cartridge housing unit 104 may include one or more odor biscuits, wherein an odor biscuit is at least a component that stores and disperses one or more aromas and/or essential oils. The odor biscuit may be interchangeable such that the airflow driver provides a unique scent and/or odor that the user may or may not enjoy. For instance, and without limitation, an odor biscuit of vanilla may be inserted to cartridge housing unit 104 such that the airflow driver emits air that at least has an odor similar to that of vanilla. As a further non-limiting example, an odor biscuit of cinnamon may be inserted to cartridge housing unit 104 such that the airflow driver emits air that at least has an odor similar to that of cinnamon.

Referring now to FIG. 3, an embodiment of cartridge housing unit of the motor of the cartridge housing unit is illustrated. Cartridge housing unit 104 is configured to include motor 116, wherein motor 116 is concentric to cartridge insertion chamber 112, as described in further detail above in reference to FIGS. 1-2. Motor 116 is mounted to support bracket 120, wherein support bracket 120 runs parallel to the diameter of cartridge insertion chamber 112 and is secured to cartridge housing unit 104, as described in detail above in reference to FIGS. 1-2. Motor 116 includes a second spindle 204 that extrudes from motor 116, wherein spindle 204 is configured on motor 116 and designed to couple cartridge housing unit 104 to the airflow driver of cartridge component 108, as described above in further detail in reference to FIGS. 1-2.

Figure 4:
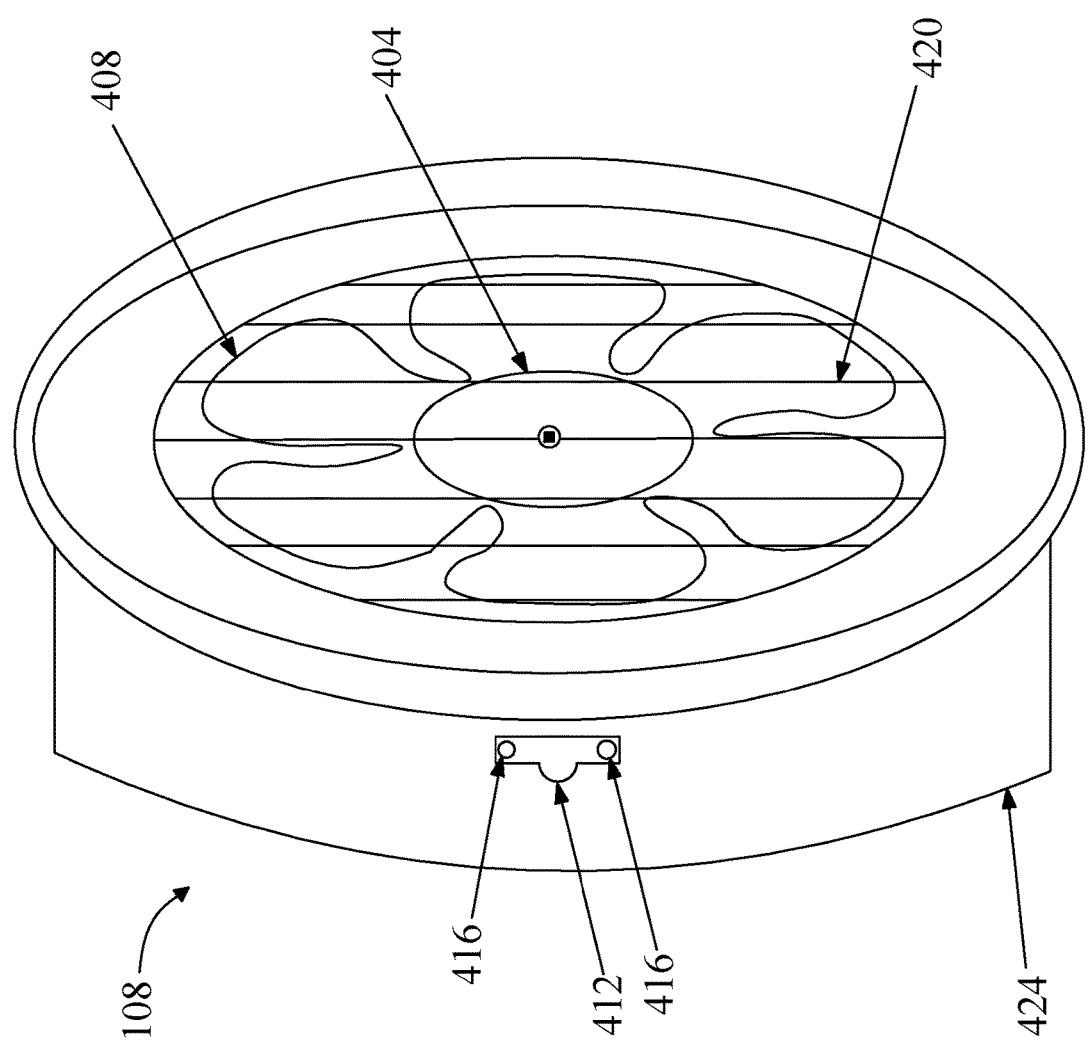
FIG. 4 is a schematic diagram of an exemplary embodiment of a cartridge component.

Referring now to FIG. 4, an embodiment of cartridge component 108 is illustrated. Cartridge component 108 may be configured to include an airflow driver of a propeller hub 404. As used in this disclosure "propeller hub" is a central connector that at least connects at least a propeller blade 408. As used in this disclosure "propeller blade" is a structure that at least maintains a pitch to form a helical spiral, when rotated, such that the rotational motion is converted into thrust and/or pressure difference to at least create airflow. Propeller blade 408 has a leading blade face, a trailing blade face, and a leading blade edge, an outer blade edge and a trailing blade edge. As a non-limiting example propeller hub 404 may connect 6 propeller blades, that at least allow for an airflow to be created when rotational movement is applied. Propeller hub 404 is designed and configured to couple to second spindle 204 by any means and/or combination of means of coupling as described above in reference to FIGS. 1-3. Propeller hub 404 may be created utilizing any material as described above in reference to materials associated with cartridge housing unit 104. Propeller blade 408 may be created utilizing any material as described above in reference to materials associated with propeller hub 404 and/or cartridge housing unit 104.

Still referring to FIG. 4, cartridge component 108 further includes a securing mechanism 412. As used in this disclosure "securing mechanism" is a mechanism designed to enable cartridge component 108 to secure to cartridge housing unit 104 for use as a personal fan. Securing mechanism 412 is located on the exterior surface of the outer casing of cartridge component 108. Securing mechanism 108 may include, for example and without limitation, a means and/or combination of means of coupling cartridge component 108 to cartridge housing unit 104, such as a combination fitting. The combination fitting may include, without limitation a male coupler, female coupler, magnetic coupling, gear tooth coupling, and the like. As a further example and without limitation, securing mechanism 412 may include a compression fit, such as a non-manipulative fitting, wherein the securing element 412 of cartridge component 108 does not require modifications to couple with cartridge housing unit 104, a manipulative fitting, wherein the securing mechanism 412 of the cartridge component 108 requires flaring and/or belling to couple with cartridge housing unit 104. Persons skilled in the art, upon reviewing the entirety of this disclosure, will be aware of various means and/or combination of means of coupling which may be suitable for use as securing mechanism 108 consistently with this disclosure. Securing mechanism 412 may include at least an insertion reference 416. As used in this disclosure "insertion reference" is a signal that at least recognizes that a cartridge component 108 is secured in a cartridge housing unit 104. Insertion reference 416 may contain at least an insertion sensor. As used in this disclosure "insertion sensor" is a device that detects a cartridge component and indicates, or otherwise responds to the detected cartridge component. Sensors may be comprised of one or more of imaging and other sensors, such as optical cameras, infrared cameras, 3D cameras, multispectral cameras, hyperspectral cameras, polarized cameras, piezoelectric sensors, motion sensors, ranging sensors, light radar component, such as lidar, detection, magnetic sensors, weight/mass sensors. As a non-limiting example a securing mechanisms may include insertion sensors of magnetic sensors, wherein the magnetic sensor may identify that a cartridge component is magnetically attached to a cartridge housing unit, wherein the insertion reference notifies the cartridge housing unit that the motor may provide power to the drive element.

With continued reference to FIG. 4, cartridge component 108 may be further configured to include an external shield 420. As used in this disclosure the "external shield" is a protective covering that at least allows air flow through the shield, while ensuring no physical obstructions interact with the airflow driver and/or first spindle. External shield 420 may include, without limitation, a structure that serves as a barrier between the airflow driver and any outside elements, such as human body parts, animals, and any item that may damage propeller blade 408 and/or cartridge component 108. External shield 420 may include materials such as metal, including, but not limited to steel, carbon steel, aluminum, and the like thereof. External shield 420 may include materials such as plastics, such as thermoplastics, thermosets, Polyethylene terephthalate (PET or PETE), Polyvinyl Chloride (PVC), Polytetrafluoroethylene (Teflon), Polyvinylidine Chloride (Saran), Polyethylene, LDPE and HDPE, or Polypropylene (PP), and the like thereof. Plastics may include recyclable plastic that may be used one or more times to produce external shield 420. Cartridge component 108 is further configured to include an outer casing 424. Outer casing 424, as described herein, is the outer structure of cartridge component 108, wherein outer casing 424 is designed to be the framework of cartridge component 108 to protect and support propeller hub 404, propeller blade 408, external shield 420, and/or any other elements within cartridge component 108.

Still referring to FIG. 4, cartridge component 108 may be designed to be a single-use, wherein single-use is each user of the plurality of users is provided a new cartridge component to operate cartridge-based personal fan apparatus 100. Cartridge component 108 may be sterilized and pre-packaged before being coupled to cartridge housing unit 104. Sterilization, as described herein, may include any means of sterilization as defined by the International Organization for Standardization (ISO) Health Care Product Sterilization Standards. Sterilization of cartridge component 108, in an embodiment would enable apparatus 104 to be an antibacterial and antimicrobial assembly.

Still referring to FIG. 4, cartridge component 108 may include at least a first electromagnetic device. As used in this disclosure an "electromagnetic device" is component that at least produces a magnetic field by an electric current such that an external device may sense and/or detect the outputted magnetic field. The at least first electromagnetic device may include a signal generator. As used in this disclosure a "signal generator" is an electric device at that least produces electronic signals with specific amplitude, frequency, and/or wave shape properties. The signal generator may be a transmitter, receiver, or transceiver, including without limitation an active radio frequency identification (RFID) tag, a passive RFID tag, or the like. For instance, the signal generator may be any device that outputs a signal using electromagnetic radiation; the signal may be sent using any frequency usable in communication, including without limitation radio waves, micro waves, infrared waves, and visible light. The signal generator may include an antenna. The signal generator may include a passive transmitter, such as those used for passive radio frequency identification ("RFID") or near field communication ("NFC") tags. In some embodiments, passive transmitter includes an antenna in which electric current is induced by magnetic coupling from an antenna; the induced electric current may power the passive transmitter, which may use additional circuitry to analyze the signal and generate a response signal. A response signal may be output by the same antenna. The response signal may be output by an additional antenna; in other words, the antenna may include multiple antennas. In some embodiments, the signal generator has a plurality of antennas to enable the signal generator to capture the signal optimally from a plurality of angles. A signal from an external device may contain no information, functioning solely to activate the passive transmitter. In other embodiments, a signal from an external device contains information that circuitry in the passive transmitter processes. The signal generator may be placed, without limitation on cartridge housing unit 104, cartridge components 108, and/or the airflow driver. As a non-limiting example an RFID tag may be placed in the airflow driver, such that the cartridge component may be identified and/or tracked as a function of the RFID tag. As a further non-limiting example, RFID tags attached to cartridge component 108 would enable an administrator to view where apparatus 100 is located, who has been using apparatus 100, and for how long that user has had apparatus 100.

Referring now to FIGS. 5A-B, an embodiment 500 of the configuration and assembly of cartridge component 108 is presented. FIG. 5A presents the embodiment of the configuration and assembly of a first side of cartridge component 108. A first side of cartridge component 108, as described herein, is the side of cartridge component 108 that is closest to the motor 116 and second spindle 204 when coupled to cartridge housing unit 104. Cartridge component 108 is further configured to include motor spindle hole 504. Motor spindle hole 504, as described herein, is the hole in the airflow driver, wherein second spindle 204 couples to the airflow driver. Coupling may include any means and/or combination of means of coupling as described above in reference to FIGS. 1-4. FIG. 5B presents an embodiment of the configuration and assembly of a second side of cartridge component 108. A second side of cartridge component 108, as described herein, is the side opposite the first side of cartridge component 108. Cartridge component 108 is further configured to include rotary spindle hole 508. Rotary spindle hole 508, as described herein, is the hole of the airflow driver, wherein first spindle 124 couples to the airflow driver. Coupling may include any means and/or combination of means of coupling as described above in reference to FIGS. 1-4.

Figure 6:
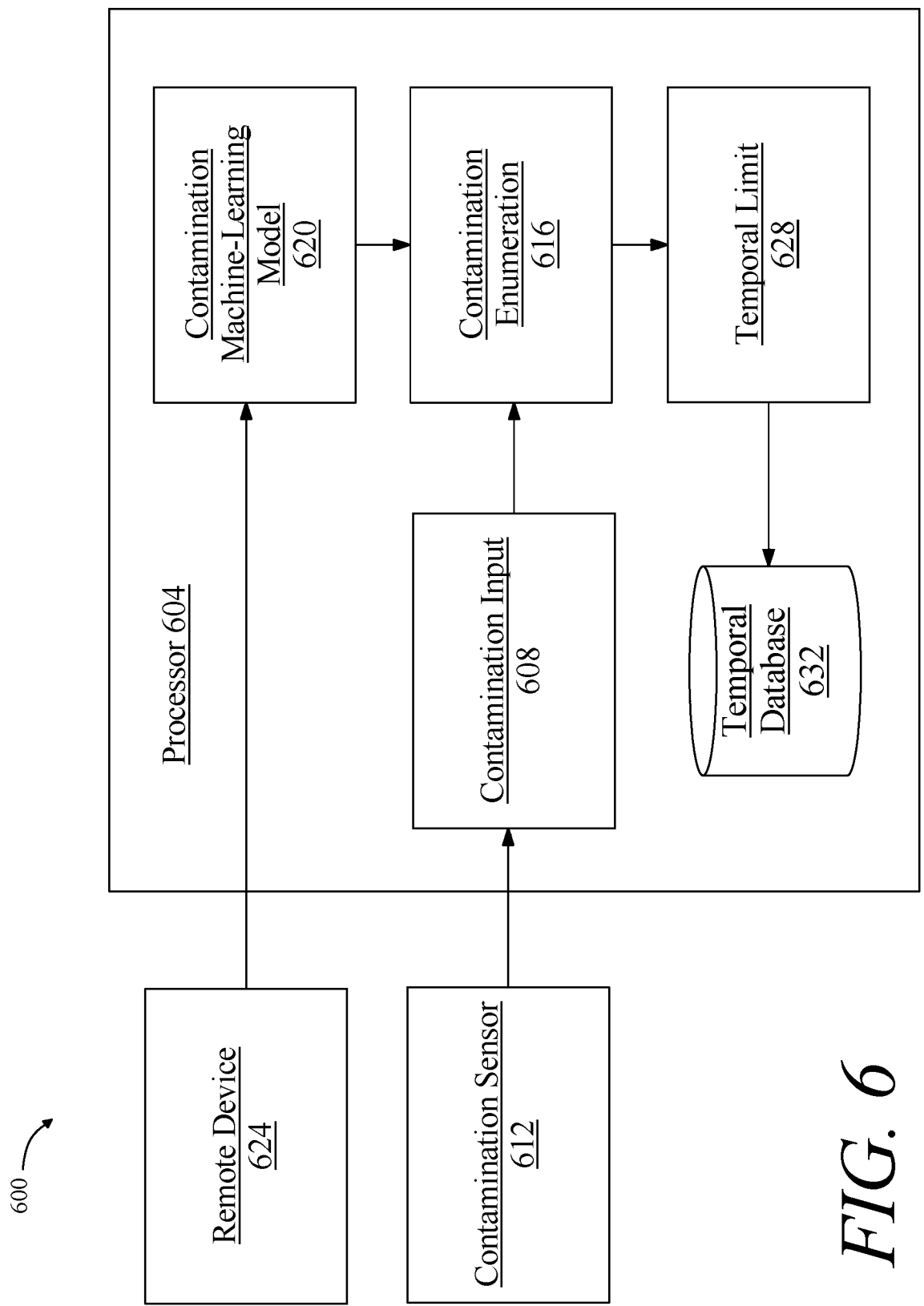
FIG. 6 is a block diagram of an exemplary embodiment of a cartridge-based fan apparatus.

Referring now to FIG. 6, an exemplary embodiment of an apparatus 600 a cartridge-based fan apparatus is illustrated. Apparatus 600 may include a processor 604. Processor 604 include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of apparatus 600 and/or computing device.

With continued reference to FIG. 6, processor 604 may be designed and/or configured to perform any method, method step, or sequence of method steps in any embodiment described in this disclosure, in any order and with any degree of repetition. For instance, processor 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 604 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 6, processor 604 may be configured to receive a contamination input 608. As used in this disclosure "contamination input" is datum that at least indicates the presence of contamination in apparatus 100, wherein contamination is pollution and/or impurities. Contamination input 608 may be received from at least a contamination sensor 612. As used in this disclosure "contamination sensor" is a device that detects contamination and indicates, or otherwise responds to the contamination. Contamination sensor 612 may be comprised of one or more of imaging and other sensors, such as optical cameras, infrared cameras, 3D cameras, multispectral cameras, hyperspectral cameras, polarized cameras, piezoelectric sensors, motion sensors, ranging sensors, light radar component, such as lidar, detection, magnetic sensors, weight/mass sensors. Contamination sensor 612 may be located on the airflow driver. Contamination sensor 612 may be located on cartridge component 108. As a non-limiting example processor 604 may receive a contamination input of a notification that an optical camera detected the presence of dirt and/or debris on the centrifugal impeller. As a further non-limiting example processor 604 may receive contamination input of the presence of bacteria on the axial propeller.

Still referring to FIG. 6, processor 604 may determine at least a contamination enumeration 616. As used in this disclosure "contamination enumeration" is a measurable value associated with the contamination input. As a non-limiting example contamination enumeration may be 20 for the presence of dirt on 2 of the propeller blades, wherein a contamination enumeration may be 94 for the presence of bacteria on 6 of the centrifugal impellers. Contamination enumeration 616 may be determined as a function of an at least contamination machine-learning model 620. As used in this disclosure "contamination machine-learning model" is a machine-learning model that may be generated and/or trained by processor 604 and/or one or more remote devices 624. As used in this disclosure "remote device" is an external device that is at least separate from processor 604 and/or apparatus 104. Contamination machine-learning model 620 may generate an output of a contamination enumeration given data provided as contamination inputs. Contamination machine-learning model 620 may be generated by one or more machine-learning processes that processor 604 and/or the remote devices 624 may utilize. The machine-learning processes include any supervised, unsupervised, or reinforcement machine-learning process that processor 604 and/or one or more remotes device 624 may or may not use in the determination of contamination enumeration 616. A machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. The machine-learning process may be trained as a function of a contamination training set. As used in this disclosure "contamination training set" is a training set that correlates at least a contamination input and at least a measurable impact value. As a non-limiting example, the contamination training set may relate a contamination input of 2 cm of debris on a propeller blade to a measurable impact value of 30. As a non-limiting example, the contamination training set may relate a contamination input of 3 cm of debris on the outer casing may relate to a measurable impact value of 47. The contamination training set may be received as a function of user-entered valuations of contamination input and/or measurable impact values. The contamination training set may be received by one or more past iterations of the previous contamination enumerations. The contamination training set may be received by one or more remote devices 624 that at least correlate a contamination input and at least a measurable impact value.

Still referring to FIG. 6, the contamination machine-learning model may be generated as a function of a classifier. A "classifier," as used in this disclosure is a machine-learning model, such as a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 604 and/or another device may generate a classifier using a classification algorithm, defined as a process whereby processor 604 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 6, processor 604 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 604 may then calculate a likelihood table by calculating probabilities of different data entries and classification labels. Processor 604 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 6, processor 604 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 6, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 6, processor 604 may receive contamination machine-learning model 620 from remote device 624. Remote device 624 may provide modifications to contamination machine-learning model 620. For example, and without limitation, a modification may include a firmware update, a software update, a contamination machine-learning model correction, and the like thereof. As a non-limiting example a software update may incorporate a new contamination machine-learning model that relates a contamination input to a modified measurable impact value. As a further non-limiting example remote device 624 may transmit a modified contamination machine-learning model, wherein the modified contamination machine-learning model may relate new measurable impact value to a previously contamination input. Additionally or alternatively, the contamination machine-learning model may be transmitted to remote device 624, wherein remote device 624 may update the contamination training data and transmit an updated contamination machine-learning model back to processor 604. The updated contamination machine-learning model may be transmitted by remote device 624 and may be received by processor 604 as a software update, firmware update, or corrected contamination machine-learning model. Additionally or alternatively, remote device 624 may provide contamination machine-learning model 620, wherein processor 604 transmits a signal, bit, datum, or parameter to remote device 624 and receives the outputted contamination enumeration from the contamination machine-learning model on remote device 624.

Still referring to FIG. 6, processor 604 may generate a temporal limit 628 as a function of the at least contamination enumeration 616. As used in this disclosure "temporal limit" is a safe lifespan for cartridge component 108, wherein a safe lifespan is where the level of dust, bacteria, microbiomes, and debris in the air like, is safe for human breathing conditions. For example and without limitation, safe human breathing conditions may be determined by building codes and/or indoor air quality standards, such as by the United States Environmental Protection Agency. Temporal limit 628 may be generated as a function of an at least temporal machine-learning model. As used in this disclosure "tem-poral machine-learning model" is a machine-learning model that may be generated and/or trained by processor 604 and/or one or more remote devices 624. The temporal machine-learning model may generate an output of a temporal limit given data provided as contamination enumerations. The temporal limit machine-learning model may be generated by one or more temporal machine-learning processes that processor 604 and/or the remote devices 624 may utilize. The temporal machine-learning processes include any supervised, unsupervised, or reinforcement machine-learning process that processor 604 and/or one or more remotes device 624 may or may not use in the determination of temporal limit 628. A temporal machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. The temporal machine-learning process may be trained as a function of a temporal training set. As used in this disclosure "temporal training set" is a training set that correlates at least a contamination enumeration and at least an expected remaining lifespan time metric, wherein a time metric includes seconds, minutes, hours, days, weeks, months, years, and the like thereof. As a non-limiting example, the contamination training set may relate contamination enumeration of 96 with an expected remaining lifespan time metric of 30 hours. As a non-limiting example, the temporal training set may relate contamination enumeration of 2 with an expected remaining lifespan time metric of 46 days. The contamination training set may be received as a function of user-entered valuations of contamination enumerations and/or expected remaining lifespan time metrics. The temporal training set may be received by one or more past iterations of the previous contamination enumerations. The contamination training set may be received by one or more remote device 624 that at least correlate a contamination enumeration and at least an expected remaining lifespan time metric.

Still referring to FIG. 6, processor 604 may receive the temporal machine-learning model from remote device 624. Remote device 624 may provide modifications to the temporal machine-learning model. For example, and without limitation, a modification may include a firmware update, a software update, a temporal machine-learning model correction, and the like thereof. As a non-limiting example a software update may incorporate a new temporal machine-learning model that relates a contamination enumeration to a modified expected remaining lifespan time metric. As a further non-limiting example remote device 624 may transmit a modified temporal machine-learning model, wherein the modified temporal machine-learning model may relate new expected remaining lifespan time metric to a previous contamination enumeration input. Additionally or alternatively, the temporal machine-learning model may be transmitted to remote device 624, wherein remote device 624 may update the temporal training data and transmit an updated temporal machine-learning model back to processor 604. The updated temporal machine-learning model may be transmitted by remote device 624 and may be received by processor 604 as a software update, firmware update, or corrected temporal machine-learning model. Additionally or alternatively, remote device 624 may provide temporal machine-learning model 620, wherein processor 604 transmits a signal, bit, datum, or parameter to remote device 624 and receives the outputted temporal limit from the temporal machine-learning model on remote device 624.

Still referring to FIG. 6, processor 604 may store the generated temporal limit information in at least a temporal database 632. Temporal database 632 may be implemented, without limitation, as a relational databank, a key-value retrieval databank such as a NOSQL databank, or any other format or structure for use as a databank that a person skilled in the art would recognize as suitable upon review of the entirety of this disclosure. Temporal database 632 may alternatively or additionally be implemented using a distributed data storage protocol and/or data structure, such as a distributed hash table or the like. Temporal database 632 may include a plurality of data entries and/or records as described above. Data entries in a databank may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a databank may store, retrieve, organize, and/or reflect data and/or records as used herein, as well as categories and/or populations of data consistently with this disclosure.

Still referring to FIG. 6, processor 604 may present temporal limit 628 to an individual. Processor 604 may present a previously stored temporal limit that was stored in temporal database 632. Processor may present temporal limit information as a function of one or more RFID sensors that at least access a particular section of temporal database, such that an individual only receives information pertaining to a specific cartridge component. Processor may present temporal limit 628 using one or more wireless communication signals, wherein a wireless signal is an electromagnetic transfer of information between two or more points that are not connected by an electrical conductor. Wireless communication may be controlled using one or more computer applications that may transmit and/or receive the electromagnetic transfer of information. For example, and without limitation a computer application may be present on a user's smartphone and/or telecommunication device that at least allows the user to control, alter, and/or interact with processor 604 to provide a unique function of system 100. The wireless communication signals may include, without limitation, radio waves, electric fields, mobile broadband, Wi-Fi, and/or the BLUETOOTH protocol promulgated by Bluetooth SIG, Inc. of Kirkland, Wash., wherein Bluetooth is a wireless technology used for exchanging data between fixed mobile devices over short distances using ultra high frequency radio waves between 2.402 GHz to 2.480 GHz. As a non-limiting example processor 604 may maintain communication via Bluetooth, with a user device, that at least allows the user device to alter, control, and/or maintain function of cartridge housing unit 104, cartridge component 108, and/or processor 604.

Figure 7:
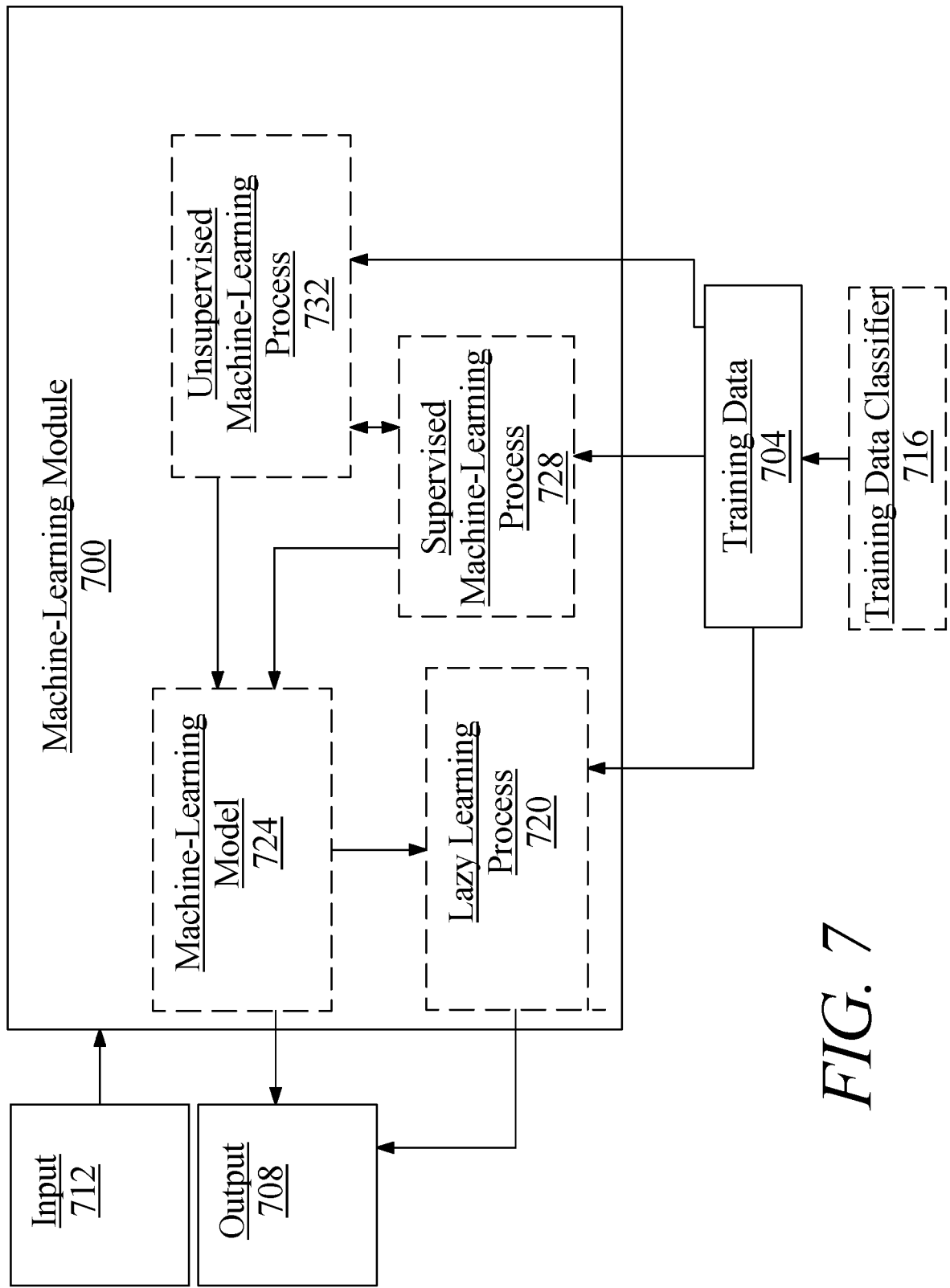
FIG. 7 is a block diagram of an exemplary embodiment of a machine-learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example contamination input may be received, wherein an output of a contamination enumeration may be determined.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a process whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to categories of contamination, such as dirt, debris, dust, and the like thereof.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include contamination input of dust as described above as inputs, contamination enumeration of 20 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 8:
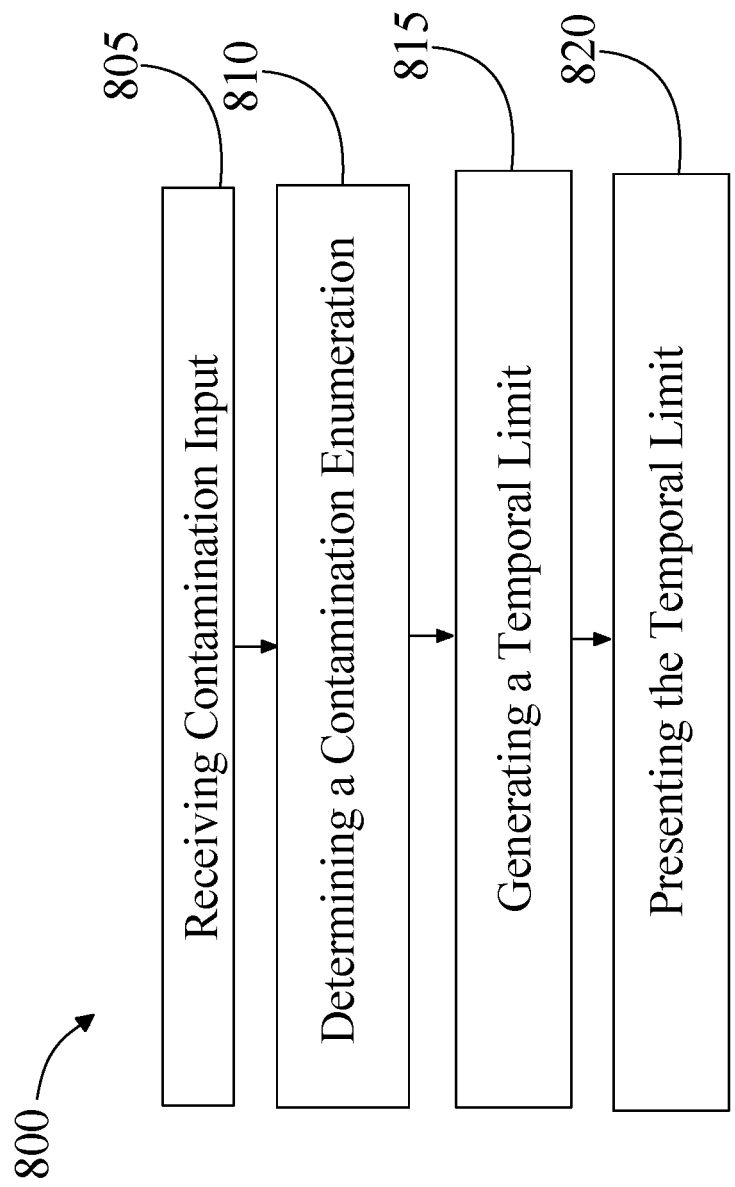
FIG. 8 is a flow diagram of an exemplary embodiment of a method of a cartridge-based fan.

Referring now to FIG. 8, an exemplary embodiment of a method 800 of a cartridge-based fan is illustrated. At step 805, a processor 604 in communication with a cartridge component 108 receives contamination input 608 from at least a contamination sensor 612; this may be implemented, without limitation, as described above in reference to FIGS. 1-7. At step 810, processor 604 determines at least a contamination enumeration 616, wherein the contamination enumeration is determined as a function of an at least contamination machine-learning model 620; this may be implemented, without limitation, as described above in reference to FIGS. 1-7. At step 815, processor 604 generates a temporal limit 628 as a function of the at least a contamination enumeration 616; this may be implemented, without limitation, as described above in reference to FIGS. 1-7. At step 820, processor 604 presents the temporal limit 628; this may be implemented, without limitation, as described above in reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
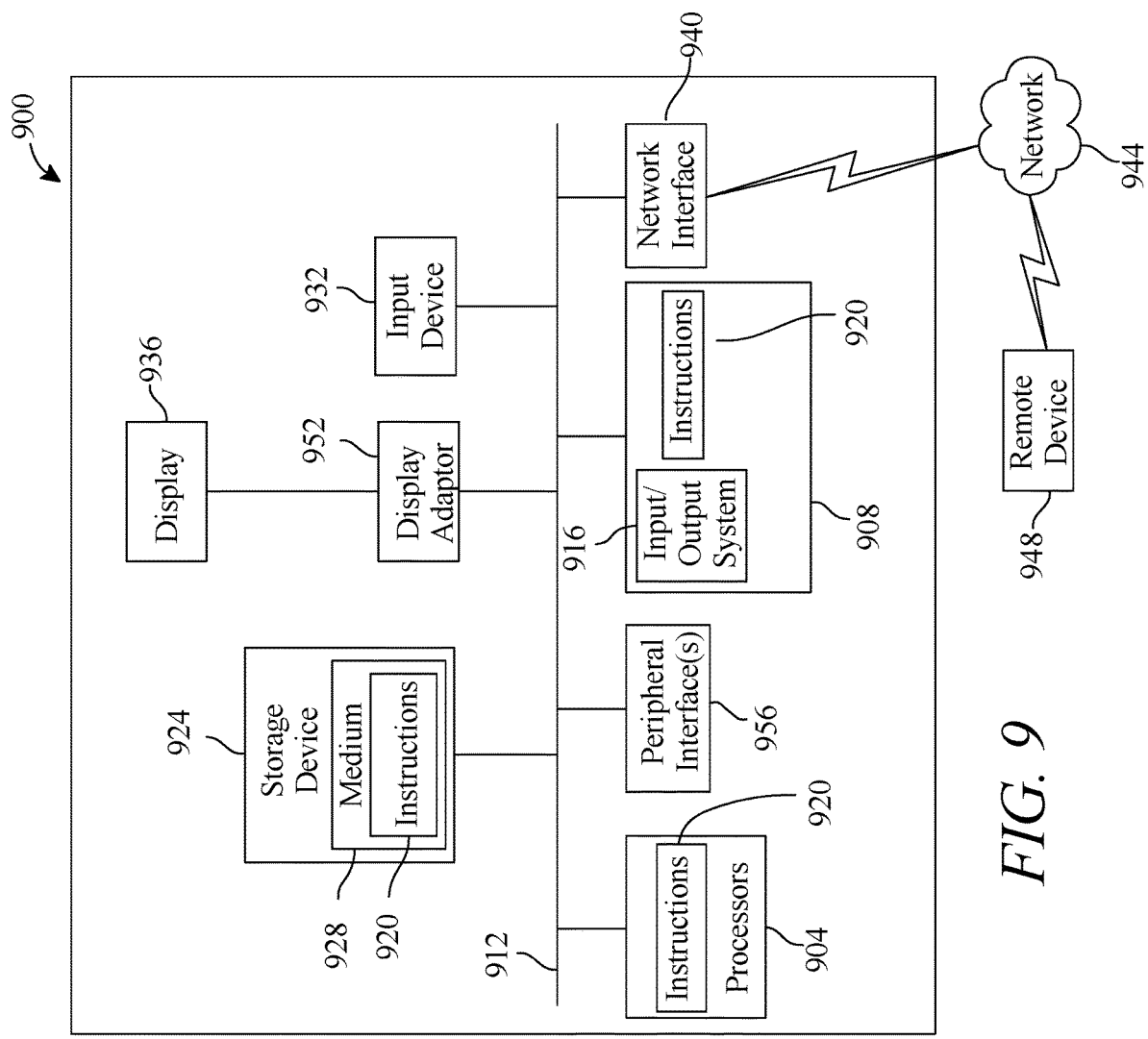
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956.

Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve system and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A cartridge-based fan apparatus, the apparatus comprising:
    a cartridge component, wherein the cartridge component includes at least an airflow driver;
    a cartridge housing unit, wherein the cartridge housing unit includes a cartridge insertion chamber, a motor, and a drive element that mechanically couples the motor to at least a first spindle when a cartridge is inserted in the cartridge insertion chamber; and
    a securing mechanism that secures the cartridge component in the cartridge insertion chamber, wherein the securing mechanism includes at least an insertion reference, wherein the insertion reference contains at least an insertion sensor.

2. The apparatus of claim 1, wherein the cartridge component includes at least a first electromagnetic device.

3. The apparatus of claim 2, wherein the at least a first electromagnetic device includes a signal generator.

4. The apparatus of claim 1, wherein the cartridge component is configured to at least connect the airflow driver to the at least a first spindle by a combination fitting.

5. The apparatus of claim 4, wherein the combination fitting includes a non-manipulative fitting.

6. The apparatus of claim 4, wherein the combination fitting includes a manipulative fitting.

7. The apparatus of claim 1, wherein the at least a first spindle secured to the motor is concentric to an external shield.

8. The apparatus of claim 1, wherein the motor is concentric to a support bracket on the cartridge housing unit.

9. The apparatus of claim 8, wherein the support bracket connects to the cartridge housing unit on either end of a diameter of the cartridge insertion chamber.

10. The apparatus of claim 1, wherein the motor includes an electric drive motor configured to maneuver the drive element.

11. The apparatus of claim 10, wherein the electric drive motor includes DC motors.

12. The apparatus of claim 10, wherein the electric drive motor includes AC motors.

13. The apparatus of claim 1, wherein the cartridge housing unit includes a processor in communication with the cartridge.

14. The apparatus of claim 13, wherein the processor is configured to:
    receive contamination input from at least a contamination sensor;
    determine at least a contamination enumeration, wherein the contamination enumeration is determined as a function of at least one contamination machine-learning model;
    generate a temporal limit as a function of the at least a contamination enumeration; and
    present the temporal limit.

15. The apparatus of claim 14, wherein a contamination sensor includes at least a sensor from an airflow driver hub.

16. The apparatus of claim 14, wherein a contamination sensor includes at least a sensor from the cartridge component.

17. The apparatus of claim 14, wherein determining the contamination enumeration further comprises gaining the at least one contamination machine-learning model from at least one remote device and determining the contamination enumeration as a function of the contamination machine-learning model and the contamination input.

18. The apparatus of claim 14, wherein generating the temporal limit includes storing temporal limit information in at least a temporal database.

19. The apparatus of claim 1, wherein the securing mechanism includes a combination fitting.

* * * * *